United States Patent [19]

Lesage et al.

[11] Patent Number: 5,388,432
[45] Date of Patent: Feb. 14, 1995

[54] COVERING FOR BENDING FORMS AND IMPROVED BENDING METHOD UTILIZING SAME

[75] Inventors: Jean-Luc Lesage, Compiegne; Rene Gy, Villemomble, both of France

[73] Assignee: Saint-Gobain Vitrage International, Courbevoie, France

[21] Appl. No.: 844,436

[22] Filed: Mar. 2, 1992

[30] Foreign Application Priority Data

Mar. 1, 1991 [FR] France ............... 91 02514

[51] Int. Cl.$^6$ .............................................. D04B 7/16
[52] U.S. Cl. .................................. 66/202; 57/238; 57/244
[58] Field of Search ................ 428/225, 259; 139/425 R; 66/202; 57/244, 238

[56] References Cited

U.S. PATENT DOCUMENTS

| | | |
|---|---|---|
| 2,837,462 | 6/1958 | VanNordenMorin . |
| 3,658,741 | 4/1972 | Keutson . |
| 4,052,185 | 10/1977 | Kolakowski ............. 65/106 |
| 4,207,367 | 6/1980 | Baker, Jr. . |
| 4,278,717 | 7/1981 | Aoyama .................. 428/36 |
| 4,313,988 | 2/1982 | Pivot et al. ............. 428/222 |
| 4,381,332 | 4/1983 | Fulmer et al. . |
| 4,499,134 | 2/1985 | Whitely et al. .......... 428/102 |
| 4,647,495 | 3/1987 | Kanayama et al. ....... 428/246 |
| 4,686,135 | 8/1987 | Obayashi et al. ........ 428/265 |
| 4,922,969 | 5/1990 | Campman ............... 139/408 |
| 4,980,564 | 12/1990 | Steelmon ................ 250/505.1 |
| 5,030,507 | 7/1991 | Mudge et al. . |
| 5,130,372 | 7/1992 | Lences et al. . |
| 5,145,734 | 9/1992 | Ito et al. ................. 428/229 |

FOREIGN PATENT DOCUMENTS

| | | | |
|---|---|---|---|
| 0312441 | 4/1989 | European Pat. Off. | C03B 27/00 |
| 0319298 | 6/1989 | European Pat. Off. | C03B 23/023 |
| 0388249 | 9/1990 | European Pat. Off. | C03B 23/035 |
| 2606398 | 5/1988 | France | C03B 23/02 |
| 2644156 | 9/1990 | France | C03B 23/023 |
| 2168339 | 11/1985 | United Kingdom | C03B 11/05 |

Primary Examiner—George F. Lesmes
Assistant Examiner—C. Raimund
Attorney, Agent, or Firm—Oblon, Spivak, McClelland, Maier & Neustadt

[57] ABSTRACT

A covering made of heat-resistant fibers for tools in contact with glass heated to beyond their softening point, in particular, for bending/tempering tools which are themselves heated in excess of the softening points of the glass sheets, is composed partially of metal fibers and partially of ceramic fibers.

8 Claims, No Drawings

COVERING FOR BENDING FORMS AND IMPROVED BENDING METHOD UTILIZING SAME

BACKGROUND OF THE INVENTION

1. Field of the Invention

The present invention concerns techniques for bending glass sheets, and, more specifically, a covering for a solid bending form against which the glass sheet is placed during the bending process.

2. Description of the Prior Art

In the most frequently used bending techniques, a glass sheet, heated in excess of its deformation temperature, is placed, at least once during the bending process, against a bending form comprising a plate made of a heat-resistant sheet metal or ceramic material and embodying, as required, a shape which more or less approaches the final shape which one desires to impart to the glass sheet. This bending form is most often used in combination with a frame having an open, curved profile in its center; accordingly, this form, whether incorporating a flat or curved shape, is currently termed a "solid bending form," in contradistinction to this frame.

Furthermore, positioning the sheet against the solid form, when the latter is curved, may entail a true mechanical pressing of the glass sheet between the solid form and a ring-shaped mold, which is also curved. This pressing operation makes possible the production of windows having complex shapes and/or which are made particularly convex at localized points.

Whether or not a pressing operation occurs during bending, the surface of the solid form coming into contact with the glass sheets is obtained by means of an interposed covering arranged on this form and which must possess well-defined properties.

First, whatever the nature of the covering envisaged, it must be easily attached to the form, so as to make the procedure for changing the interposed covering as short and as simple as possible. To this end, it must, therefore, be able to take on the contours of the form, and, in particular, when a fabric is used, possess, for this purpose, the ability to be well stretched on the form while being relatively flexible and extensible.

Furthermore, once attached to the form, the soft nature of this covering is designed to soften the contact between the glass and the upper form, in which any small imperfections which may subsist in spite of machining are covered over by this sheathing.

In addition, even supposing the bending form to be perfectly smooth, the dust sandwiched between the glass and the form must be taken into consideration. Consequently, the covering must possess a degree of porosity in order to be able to absorb this dust before it threatens to mark the surface of the softened glass.

By virtue of its nature, the texture itself of the covering must not, a fortiori, be capable of leaving imprints on the glass, so as not to impair the optical quality of the windows produced. Therefore, it is desirable that the covering be highly dense and possess a very smooth surface in contact with the glass sheets.

Furthermore, it happens often that enamelling compounds cover the upper surface of the sheet which comes into contact with the upper form.

In fact, these enamelling compounds are applied as batch compounds at the entry to the oven which heats the glass sheets to the bending and/or tempering temperature, and, of course, on the upper surface of the glass sheet, i.e., on the surface which does not come into contact with the conveyor belt, normally of the roller type, which transports the glass through the oven.

Depending on the enamelling compounds used, the enamels, which may not be completely baked when the glass sheet enters the bending station where the bending form is installed, possess a relatively high degree of tackiness. This adherence may cause, on the one hand, damage to the coating, which may be torn away from the form, and it may produce, on the other hand, random delays in the descent of the glass sheets, which must then be compensated for by reduced speed, potentially at the cost of curvature defects.

In addition, said covering must also possess total chemical inertness in relation to the glass sheets, in order that no interfering chemical reaction damage the covering and/or the glass sheets.

According to another crucial requirement, which is added to the preceding ones, the covering must preserve all of its properties intact for the longest possible time at high temperatures. In fact, when attached to the form, the covering must be capable of supporting a temperature greater than 650° C. without deterioration, at least during an interval which is industrially satisfactory, since it is clear that changing the interposed element entails halting production.

A first type of covering used incorporates a fabric made of E glass fibers, i.e., a non-alkaline heat-resistant glass. However, the limiting use temperature of a material of this kind is quite close to the temperature of a glass sheet in a bending chamber; accordingly, this fabric deteriorates rapidly because of oxidation. Moreover, the impression of the weft of the fabric appears on the bent glass sheet, thereby strongly affecting its optical quality.

To solve the problem of deterioration caused by oxidation at high temperatures, the use of silica and/or alumina fibers sintered using a mineral binding agent in order to form a paper has been advocated. The nonwoven texture of the paper prevents marking, and the very high degree of resistance to heat of the fibers used protects the covering from any oxidation at the temperature of use. However, it has certain disadvantages.

A paper whose thickness is between approximately 1 to 2 mm must be used if one wishes to stretch it correctly without tearing on the form; but this gives, as a corollary, a stiffness to the paper which is poorly suited to the most complex bending forms, thereby creating a problem arising from the positioning of the interposed element.

In addition, the paper is generally glued against the bending form. If the glue is not applied with the requisite care, small lumps are formed which create blisters whose imprint can be seen on the glass. Moreover, the porosity of the paper allows the glue to shift in spots until it reaches the paper surface; once again, marking of the glass is observed.

Furthermore, when the glass sheets incorporate relatively sticky enamelling compounds, shreds of paper transported by the sheets tend to become detached, thus requiring rapid replacement of the covering.

Use is also conventionally made of a covering incorporating heat-resistant metal fibers assembled together, for example, as knitted fibers, as disclosed in Patent Application FR-A-2 606 398, or as a woven or knitted felt, as proposed by Patent FR-A-2 644 156.

While this type of covering offers other advantages because of the suppleness of its texture, ease of placement on the form, for example, through simple tension produced by clamps, its performance level tends to deteriorate over time at high temperatures. Thus, it may ultimately give a somewhat rough appearance, the fibers tend to thin out and become brittle, and this progressive wear, although occurring less rapidly than that of a fabric made of glass fibers, ends up by marking the glass. This wear results from oxidation, which occurs even when steel fibers termed "stainless" are used under normal bending operation temperature conditions.

SUMMARY OF THE INVENTION

The technical problem which the invention attempts to solve is thus to obviate these difficulties by supplying a new covering for solid bending forms, and more generally, for all tools in contact with glass sheets heated to their softening point, this covering possessing the required properties previously mentioned and whose prolonged life makes replacement less frequent.

This problem is solved according to the invention by producing a covering which incorporates heat-resistant fibers, some metal and others ceramic, said covering being designed for tools heated to the temperature of glass sheets heated to a temperature higher than their softening point and with which they are in contact, and in particular, bending/tempering tools such as a solid form.

More particularly, the present invention provides a covering for a tool contactable with a glass sheet heated to at least the softening point of the glass, the covering comprising a fabric of metal fibers and ceramic fibers.

Additionally, the present invention provides an improved glass bending process wherein a sheet of glass, heated to a temperature at least equal to the softening temperature of said glass, is contacted with a bending form, wherein the bending form comprises a bending tool having a shape which is to be imparted to the sheet of glass and a covering disposed over a surface of the bending tool to be contacted with the sheet of glass, the improvement comprising the covering contactable with the glass sheet comprising a fabric of metal fibers and ceramic fibers.

DETAILED DESCRIPTION OF THE INVENTION

The metal fibers are preferably stainless steel, nickel chrome alloy or iron-chrome-nickel alloy; and the ceramic fibers are advantageously silica.

By thus associating two different kinds of fibers in a single covering, a particularly advantageous and surprising feature of the invention is achieved. That is, the metal fibers impart mechanical strength and contribute adequate texture, while the ceramic fibers guarantee resistance to temperature, and a true synergy is thus obtained, thereby giving a covering whose wear is slowed very appreciably.

The simplest explanation of this phenomenon apparently lies in the fact that a lesser quantity of metal fibers in the covering leads to a diminished risk of oxidation of said metal fibers, since a portion of them is thus replaced by ceramic fibers. By reducing and slowing oxidation and wear of the covering, its life is increased appreciably.

It may also happen that a very close contact between metal and ceramic material influences the propagation of the corrosion of the metal resulting from the diffusion of ambient oxygen at high temperatures.

This covering is advantageously composed of a woven or knitted fabric, since these textures allow the covering to be mounted on a solid form simply by stretching the fabric over the form, then clamping it behind the form.

In this way, the covering does not have to be glued, an operation which is always fairly delicate, as was previously shown.

A knitted fabric is normally the texture which exhibits the greatest extensibility. On the other hand, a woven fabric provides the smoothest contact surface, especially when it has been previously calendered.

Either of these textures may, therefore, be chosen, while taking into account, as needed, the complexity of the solid form to be covered.

All operations are carried out based on the use of elementary metal and ceramic fibers, which must be combined in order to obtain metal and ceramic fibers which can be handled, since elementary fibers, which have diameters of between 7 and 16 microns, are extremely fine. It is advantageously found that, whether the fibers are metal or ceramic in nature, they are currently manufactured within ranges of similar diameters, thereby significantly promoting the possibility of combining them.

As is known in the textile industry, the metal fibers are stable and can be woven or knitted only if they are "twisted." There are two choices possible here: the fibers may be twisted on themselves or with at least one fiber of the same type, 100% metal yarns are thus obtained; or alternatively, they may be twisted with ceramic fibers, in particular silica fibers, thereby producing yarns which could be termed "hybrid," since they incorporate a metal and a ceramic component.

The integrity of the ceramic fibers is normally guaranteed by oiling. They may be twisted together so as to produce 100% ceramic yarns whose diameter is similar to that of the 100% metal yarns.

Use may advantageously be made of techniques conventionally implemented in the textile industry to combine the 100% metal and the 100% ceramic yarns, or the "hybrid" yarns, in order to produce the covering. In particular, a knitted (or woven) fabric may be produced in which the metal-ceramic distribution is perfectly uniform over the entire thickness of the covering. However, one may also advantageously manufacture a covering which has two non-identical surfaces, each surface having its own metal-ceramic distribution. In fact, in this way the surface intended to be in contact with the metal of the solid form may be distinguished from the surface intended to be in contact with the softened glass sheet.

The overall mass proportion of metal to silica is quite variable; it ranges between 90/10 and 10/90, and preferably between 60/40 and 40/60.

It is specified that, in general, two units are used to characterize a fiber that can be knitted or woven, whether metal or ceramic: the metric number and the Tex. The metric number indicates the number of linear meters of fiber obtained for 1 gram of material, while the Tex indicates the number of grams per kilometer of said fiber.

According to the invention, the fibers are incorporated into yarns having a Tex value of between 20 and 200, or a metric number of between 50 and 5.

Having generally described this invention, a further understanding can be obtained by reference to certain specific examples which are provided herein for purposes of illustration only and are not intended to be limiting unless otherwise specified.

EXAMPLES

EXAMPLE 1

The covering was composed of a Jersey-type mesh knit using hybrid yarns comprising fibers made of 316 L stainless steel and silica fibers, these fibers having diameters of 12 and 14 microns, respectively. The overall mass proportion of the metal to silica in this covering was 50/50. The thickness of the final knit fabric was 0.7 mm, and the distance between two knitted rows was approximately 1.4 mm.

EXAMPLE 2

The covering was composed of a Jersey-type mesh knit using yarns comprising fibers made of Inconel 601 nickel alloy and yarns made from silica fibers, each of the initial fibers having a diameter of 10 microns.

Knitting was performed on a cylindrical loom using Inconel 601 yarns, and silica yarns were gradually inserted in the metal knit. The final mass proportion of metal to silica was 60/40.

In both cases, a very substantial increase in the life of these coverings as compared with a covering made solely of metal fibers was observed, thereby giving a highly slowed wear due to enhanced resistance to high temperatures. They are successfully used for both upper solid forms and for ring-shaped pressing molds, for example.

To conclude, the type of covering for bending/tempering forms perfected within the scope of the invention gives excellent optical quality to the convex windows produced using these forms. These windows are then used advantageously in automobiles (e.g., as windshields or side windows). This covering does not have to be changed frequently because of its improved strength.

What is claimed as new and desired to be secured by Letters Patent of the United States is:

1. A covering for a bending tool contactable with a glass sheet heated to at least the softening point of the glass, said covering comprising a fabric of metal fibers and ceramic fibers, wherein said fabric is a knitted fabric formed from yarns of metal fiber and yarns of ceramic fiber, the overall mass proportion of metal to ceramic in the fabric is from 10:90 to 90:10 said fibers having a diameter of 7–12 micrometers and said yarns having a Tex number of 20–200.

2. A covering for a bending tool contactable with a glass sheet heated to at least the softening point of the glass, said covering comprising a knitted fabric of metal fibers and ceramic fibers, wherein said knitted fabric is formed from a hybrid yarn, comprising at least one metal fiber, and at least one ceramic fiber, said fibers having a diameter of 7–12 micrometers and said yarns having a Tex number of 20–200.

3. The covering according to claim 1, wherein said metal fibers are selected from the group consisting of stainless steel fibers, nickel-chrome alloy fibers, iron-chrome-nickel alloy fibers, and mixtures thereof.

4. The covering according to claim 2, wherein said metal fibers are selected from the group consisting of stainless steel fibers, nickel-chrome alloy fibers, iron-chrome-nickel alloy fibers, and mixtures thereof.

5. The covering according to claim 1, wherein said ceramic fibers are silica fibers.

6. The covering according to claim 2, wherein said ceramic fibers are silica fibers.

7. The covering according to claim 1, wherein said fabric has an overall mass proportion of metal to ceramic of from 60/40 to 40/60.

8. The covering according to claim 2, wherein said fabric has an overall mass proportion of metal to ceramic of from 60/40 to 40/60.

* * * * *